United States Patent [19]
Reeves

[11] Patent Number: 5,660,417
[45] Date of Patent: Aug. 26, 1997

[54] INDICATOR FOR MAINTAINING SEALS IN FLANGE ASSEMBLIES

[75] Inventor: David W. Reeves, El Segundo, Calif.

[73] Assignee: Chevron U.S.A. Inc., San Francisco, Calif.

[21] Appl. No.: 462,940

[22] Filed: Jun. 5, 1995

[51] Int. Cl.$^6$ ............................................... F16L 35/00
[52] U.S. Cl. ............................ 285/93; 285/368; 411/14; 277/2; 116/212; 116/201; 73/49.6
[58] Field of Search ............................ 285/93, 363, 368; 411/8, 9, 10, 11, 12, 14; 277/2; 116/212, 201, DIG. 34; 73/49.1, 49.5, 49.6

[56] References Cited

U.S. PATENT DOCUMENTS

| | | | |
|---|---|---|---|
| 2,188,356 | 1/1940 | Jeans et al. | 285/93 X |
| 3,823,639 | 7/1974 | Liber | 85/62 |
| 3,851,396 | 12/1974 | Ellzey, Jr. | 116/201 X |
| 4,020,734 | 5/1977 | Bell | 85/62 |
| 4,131,050 | 12/1978 | Holmes | 85/62 |
| 4,288,105 | 9/1981 | Press | 285/93 X |
| 4,293,257 | 10/1981 | Peterson | 411/11 |
| 4,479,747 | 10/1984 | Pagal | 411/8 |
| 4,500,237 | 2/1985 | Pliml, Jr. | 411/11 |
| 4,572,717 | 2/1986 | Swick et al. | 411/11 |
| 4,648,632 | 3/1987 | Hagner | 285/93 X |
| 4,773,272 | 9/1988 | Trungold | 23/761 |
| 4,930,951 | 6/1990 | Gilliam | 411/14 |
| 5,090,871 | 2/1992 | Story et al. | 285/93 X |
| 5,195,756 | 3/1993 | Wachter | 277/106 |
| 5,199,835 | 4/1993 | Turner | 166/212 X |
| 5,280,967 | 1/1994 | Varrin, Jr. | 285/93 |

*Primary Examiner*—Terry Lee Melius
*Assistant Examiner*—Heather Shackelford
*Attorney, Agent, or Firm*—Alan W. Klaassen

[57] ABSTRACT

A deformation indicator is disclosed for repeatably adjusting the fasteners on a flange assembly to maintain a leak-free joint. The indicator is mounted on one of the fasteners used for fastening together the flange members, and extends to a predetermined distance from the adjacent flange member. When the flange fasteners must be adjusted to account for creep in the packing material in the flange, they are adjusted to restore the distance between the indicator and the adjacent flange member to the predetermined value.

16 Claims, 3 Drawing Sheets

INDICATOR FOR MAINTAINING SEALS IN FLANGE ASSEMBLIES

BACKGROUND OF THE INVENTION

1. Field of the Invention

The present invention relates to pipe joints and flange joints, and more particularly, to a gasket deformation indicator for improving maintenance of a pipe joint or flange joint.

2. Description of the Background

Flanges are commonly used in joints for conduits, vessels, rotating equipment and the like, including pipes, valves and heat exchangers. One function of a flange is to provide a leak-free joint seal. A typical flange assembly comprises two flange elements, packing material positioned between the flange elements to provide a seal, and fasteners passing into or through the flange elements for urging the flange elements against the packing material to form the leak-free seal.

Packing material useful in flanges is generally of a resilient, compressible material that deforms against the flange elements when compressive force is applied, by the flange elements against the packing material. The compressive force is generally applied by the fasteners, often through the medium of one or more spring devices mounted on the fasteners. When the compressive force is reduced or removed, the packing material, at least to some extent, recovers its original or previous shape. However, over time and with repeated deformations, the packing material loses resiliency and becomes permanently deformed in a process known as "creep". Creep of the packing material may compromise the seal in the joint, leading to leaks in the joint; to compensate, the fasteners clamping the flange elements must be periodically readjusted to restore the compressive force on the packing material and thus reseal the joint.

One or more spring devices may be installed in the flange assembly, usually mounted on the fasteners, to help maintain a "live-load" on the packing material. While these spring devices are generally adequate for maintaining a stable seal over the life of packing material subjected to only mild conditions of temperature and pressure, packing material subjected to severe conditions and/or to thermal cycling will often undergo excessive creep beyond what can be accommodated by the spring devices to maintain adequate compressive force. Under these conditions the fasteners on the flange assembly is frequently adjusted to maintain a leak-free seal.

Adjusting each fastener to achieve a leak-free joint must be done with great care. Undertightening the fasteners results in an inadequate seal. Overtightening the fasteners may damage the integrity of the packing material. It is desirable to have available an indicator for indicating the extent of deformation of the packing material in a flange assembly. Desirably, such an indicator would provide reproducible measurement of the extent of deformation without requiring that the flange assembly be disassembled in order to make the measurement. While a number of devices have been disclosed for indicating the tension on a fastener (Examples include U.S. Pat. Nos. 3,823,639; 4,020,734; 4,131,050, 4,293,257; 4,479,747; 4,500,237; 4,572,717; 4,773,272; 4,930,951; 5,195,756; 5,199,835.), all are inadequate for maintaining a seal in a flange assembly and for achieving a predetermined amount of deformation of the packing material contained in the flange assembly.

SUMMARY OF THE INVENTION

It is therefore an object of the present invention to provide a device for indicating the extent of deformation of packing material contained in a flange assembly for maintaining a leak-free seal in the flange assembly.

It is another object of the present invention to provide an indicator useful for restoring the compressive force on packing material contained in a flange assembly.

It is still another object of the present invention to provide an indicator for extending the life of packing material contained in a flange assembly.

It is still another object of the present invention to provide an indicator for monitoring the viability of packing material contained in a flange assembly.

It is still another object of the present invention to provide an inexpensive and reliable tool useful for properly adjusting a flange assembly to restore a leak-tight condition in the flange assembly without damaging the packing material.

According to the present invention, the above-described and other objects are accomplished by providing a flange assembly comprising diametrically opposed flange members, a packing material interposed between the flange members, a plurality of fasteners connecting the flange members, spring means mounted on the fasteners for applying compressive force to the flange members to form leak-free seals between the flange members and the packing material, and at least one deformation indicator mounted on an indicator fastener connecting the flange members and having a first portion that extends outwardly from the axis of the indicator bolt and a second portion extending at an angle from the first portion in the direction of an adjacent flange member, the second portion having a distal end positioned at a predetermined distance from the adjacent flange member when the packing material is deformed to a predetermined extent to form a leak-free seal.

Further to the invention, a deformation indicator is provided for use with a flange assembly that includes diametrically opposed flange members, a packing material interposed between the flange members, cooperating nuts and bolts connecting the flange members and spring means mounted on the bolts for applying compressive force to the flange members to form leak-free seals between the flange members and packing material, the deformation indicator being mounted on one of the bolts and having a first portion extending outwardly in a plane perpendicular to the axis of the bolt to a second portion, the second portion extending at an angle of between about 60° and 120° from the first portion in the direction of an adjacent flange member, a distal end of the second portion being positioned proximate the adjacent flange member.

Further to the invention, a method is provided for maintaining a flange assembly in a leak-free condition, the flange assembly comprising first and second flange members, packing material positioned between the flange members, a plurality of fasteners for connecting the flange members, and at least one deformation indicator comprising a first portion mounted on a fastener and a second portion extending from the first portion such that a distal end of the second portion is a predetermined distance from an adjacent flange member, the method comprising adjusting the fasteners such that the packing material is deformed to a predetermined extent to form a leak-free seal, determining the distance between the adjacent flange member and the distal end of the second portion and readjusting the fasteners to urge the flange members in compressive force against the packing material and to restore the distance between the distal end of the second portion and the adjacent flange member to the previously determined distance.

IN THE DRAWINGS

DETAILED DESCRIPTION OF THE INVENTION

Figure 1:
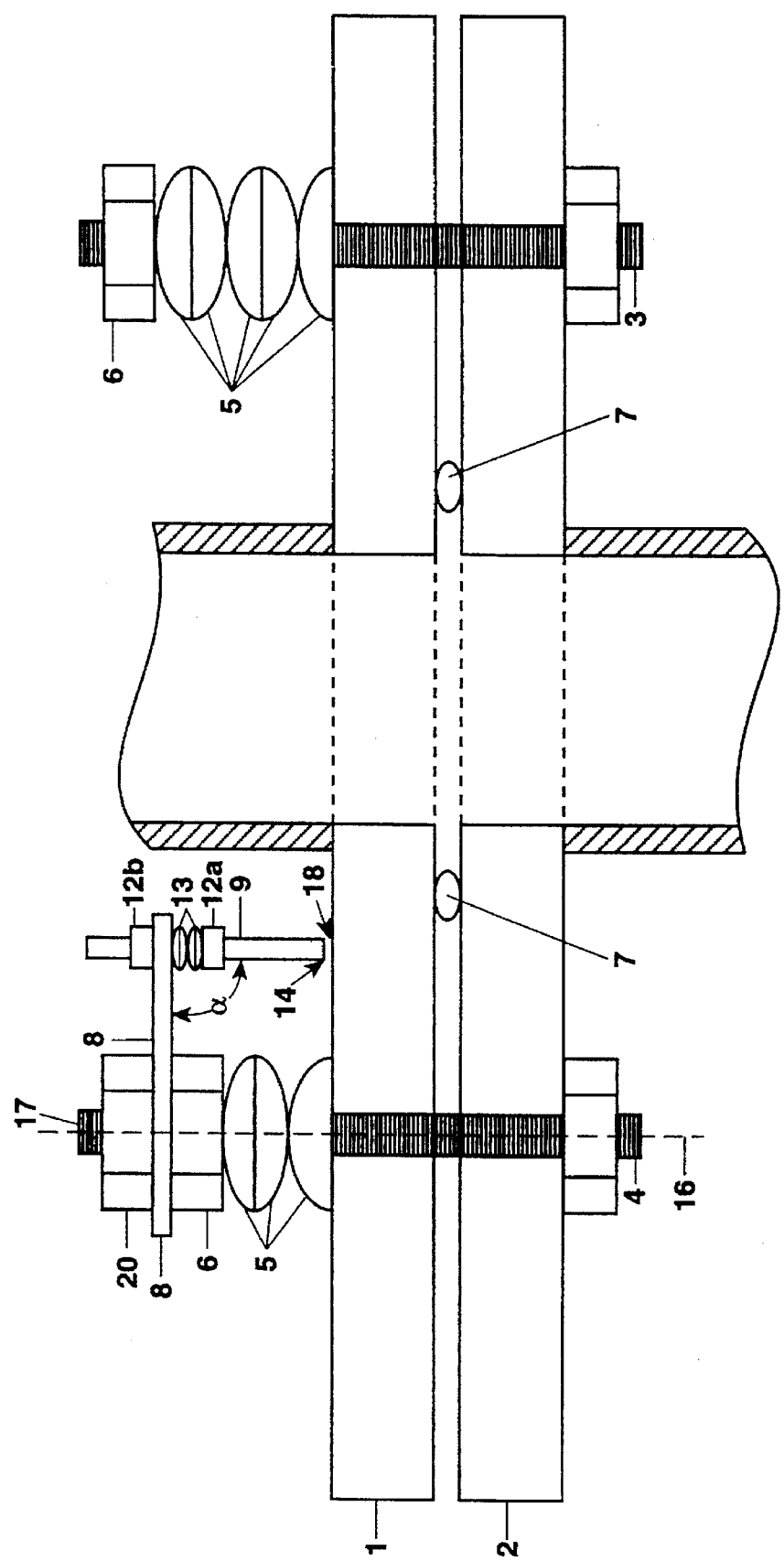
FIG. 1 is a cross-section view of a flange assembly showing a deformation indicator of this invention mounted on flange fastener.

The present invention is directed to a deformation indicator and a process for maintaining a leak-free seal in a joint connecting two or more liquid- and/or gas-containing vessels or conduits. The joint may be used in either a static or a dynamic operating mode. In a static operating mode, the packing or gasket forms a seal between two joint faces, with the packing being deformed such that the pressure applied between the packing and the joint face is greater than that which is exerted by the contained liquid or gas that tends to leak past the joint. A joint of this type may be present, for example, in pipe or conduit unions, as a junction between a conduit and a vessel, as a junction between vessels, or as a cover in a vessel, such as in a heat exchanger, a reactor, or a containment vessel. An example joint of this type is shown in FIG. 1. Packing materials for the dynamic mode, which involves reciprocating, rotating, and helical motions, are generally termed "mechanical packings". Non-limiting examples of flange assemblies operated in a dynamic mode which would benefit from the present invention include flange assemblies on valves, pumps, motors and the like. A useful review of packing materials for both static and dynamic applications may be found in Kirk-Othmer: *Encyclopedia of Chemical Technology*, New York: John Wiley & Sons, 3rd Ed., 1981, Vol 16, p. 725.

Packing material useful in the present invention is well known in the art. The ideal packing material is a resilient, predictably compressible composition of one or several materials which conform easily to joint-face surface irregularities, can compensate for joint-face distortion during operation and thermal fluctuations, is stable at the conditions encountered by the joint and is inert to the liquids and gases contained within the joint. Suitable packing materials are made from flexible materials, including fabric, rubber, plastic and metals. Some are sheathed with a wire, wire mesh or wire netting for longer life and better performance at severe conditions. For high temperature, high pressure applications, a spiral-wound gasket comprising a specially formed metal strip and an alternating nonmetallic strip may be used. The spring action of the formed metal reacts to compression, internal pressure changes and temperature variations, and the nonmetallic filler easily compresses under fastener load to improve sealability.

The flange assembly shown in FIG. 1 includes diametrically opposed flange members 1 and 2 removably joined by a plurality of fasteners 3, each fastener in the flange assembly being adjusted to maintain compressive force on the flange, thereby urging each flange member toward the other and against the packing material positioned between the flange members. Tightening the flange members against the packing material tends to deform it as a seal is established. It is desirable to reproduce this extent of deformation following use of the flange assembly, and particularly after the packing material has experienced creep during use, in order to maintain the leak-free condition of the flange assembly.

Fasteners useful in the present flange assembly are well known in the art, and a detailed description of the fasteners is not required here. Example fasteners include a stud comprising a head and a threaded portion and a bolt comprising a head, at least one threaded portion and at least one nut. While specific practice may prefer using one or the other, for the purposes of this specification, the terms "bolt" and "stud" will be used interchangeably unless stated otherwise. The compressive force applied by fasteners 3 urging flange members 1 and 2 against packing material 7 deforms the packing material to form a leak-free seal. For every application, the fastener loading of a joint must be great enough to resist hydrostatic end forces and to retain a sufficient compressive load on the packing material to maintain a leak-free joint. The necessary initial and operating bolt loads for many gasket designs and materials are described in ASME Boiler and Pressure Vessel Code, Division 2, Alternate Rules, Appendix 3, 1977.

To maintain a leak-free condition during use of a joint, it is important that the compressive load on the packing material contained in the joint be kept relatively constant. The design of the packing material can be tailored to compensate somewhat for variations in pressure and temperature encountered in the joint. One or more spring means 5 mounted on each fastener 3 further helps to maintain a relatively constant compressive load on packing material 7 during use at varying temperatures and pressures. When the fastener is in a live-loaded condition, each spring means provides spring compressive force against the fastener and against adjacent flange member 1, thereby urging flange members 1 and 2 together against packing material 7 to form a seal. Spring means 5 useful for the present invention are well known in the art. Conical compression springs, coil springs, lock washers, split washers or combinations thereof are typical, non-limiting examples of spring means useful for the present invention. Conical compression springs are also known in the art by a number of different names, including frustoconical washers, coned disk springs, Belleville springs, disc springs, spring washers, Belleville disc springs and conical compression washers. Additional information on conical compression springs may be found in the "Manual on Design and Manufacture of Coned Disk Springs (Belleville Springs) and Spring Washers" SAE HS 1582 First Edition, June 1988.

While the design of the packing material and the use of spring means serves to compensate for thermal and pressure effects on the joint during use, these are not adequate to compensate for creep in the packing material brought on by extended use and/or thermal cycling of the flange assembly. For example, when subjected to a thermal cycle during use, the elements of a flange assembly will thermally expand and contract, first further deforming and then reducing the compressive load on the packing material. Thus, when the flange assembly is cooled following such a heating step, the compressive load is reduced, but the packing material has been caused to creep in the joint and does not fully recover its shape. The seal is therefore compromised. Restoring the seal requires restoring the compressive load on the packing material by readjusting the fasteners. The present deformation indicator provides a tool and a process for maintaining constant compressive force on the packing material contained in a flange assembly.

Figure 3:
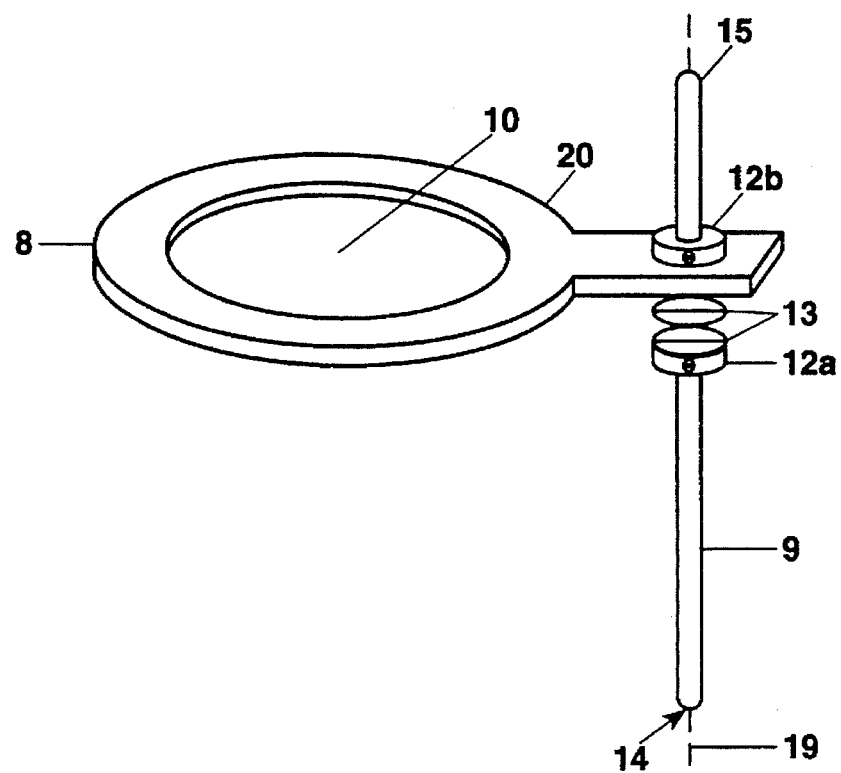
FIGS. 3–5 show three embodiments of the deformation indicator of this invention.

The specific embodiment of the deformation indicator included in the flange assembly in FIG. 1 is separately shown in FIG. 3. In FIG. 1 the deformation indicator is shown mounted on indicator fastener 4. In general, indicator fastener 4 on which a deformation indicator is mounted is substantially identical to the fasteners on the flange assembly not having a mounted deformation indicator. However, indicator fastener 4 need not be identical to remaining fasteners 3, and the present invention is not limited by similarities or differences among the fasteners used in the flange assembly, both those on which the indicator is mounted, and those not having an indicator mounted thereon.

A single deformation indicator is preferably mounted on a single fastener, though it will be readily apparent to one skilled in the art, in view of this disclosure, how to modify the first portion of the deformation indicator in order to mount a single deformation indicator on more than one fastener. The number of deformation indicators on a flange assembly can vary from a single indicator per assembly to an assembly having an indicator on each and every fastener which is part of the assembly. In general, more indicators are needed for larger flanges. Thus, for flanges less than 4 inches in diameter, 1 indicator is generally sufficient. For flanges greater than 4 inches but less than 12 inches in diameter, 1 or 2 indicators are preferred. For flanges greater than 12 inches in diameter, up to 4 or more indicators may be necessary for maintaining a leak-free seal within the flange assembly. When more than one indicator is mounted on the flange assembly, each will be used to best advantage when mounted on a separate fastener, particularly if each is positioned approximately equidistant from other indicators mounted around the circumference of the flange assembly.

While the indicator may be positioned anywhere along the length of the indicator fastener outward of at least one spring means 5, it is preferably positioned near distal end 17 of the fastener. In FIG. 1, the deformation indicator is shown mounted on a bolt between two nuts 6 and 20. In the flange assembly of this invention, the nut 20 adjacent the distal end 17 of the indicator fastener may be replaced by, for example, a fixed head on the bolt. Alternatively the nut between the indicator and the adjacent flange member 1 may be replaced with a spring means positioned on the indicator fastener, so that the indicator moves cooperatively with the spring means. Additional elements, such as collars or welds may be used to fasten the indicator to the indicator fastener. Likewise, other elements, such as one or more washers, may be positioned adjacent the indicator on the indicator fastener.

Figure 2:
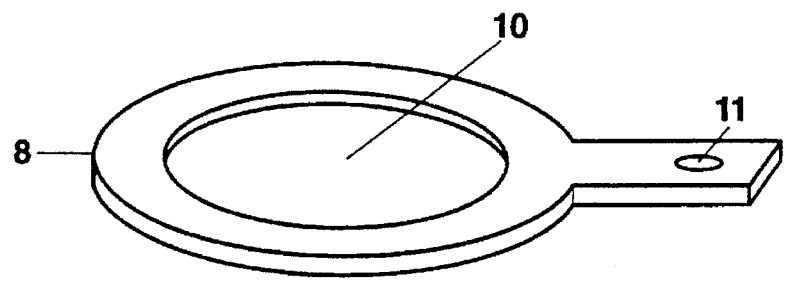
FIG. 2 shows one embodiment of the first portion of the deformation indicator of this invention.

The indicator comprises a first portion 8 and a second portion 9 that projects from first portion 8 to a predetermined distance from adjacent flange member 1 when packing material 7 is deformed to a predetermined extent to form a leak-free seal. FIG. 2 shows one embodiment of first portion 8, having first aperture 10 for receiving the indicator fastener 4 and second aperture 11 for receiving outer portion 9. The shape and size of first portion 8 of the deformation indicator is not critical. However, it is important that the first portion be of a size and shape, and have a composition, such that the first portion will not easily deform during use on the flange assembly, particularly during use at a high temperature. For this reason, the first portion will generally be of a hard, metallic material. The thickness of first portion 8 is dictated largely by the length of the indicator fastener and the thickness of other elements present on the fastener. Generally, first portion 8 is a flattened washer lying in a plane extending perpendicular to longitudinal axis 16 of indicator fastener 4 to a position beyond the radius of the spring means, the nuts and fastener heads, and any other element mounted on the indicator fastener between the indicator and the adjacent flange member. The preferred first portion has the shape of a flat, irregularly-shaped washer having a thickness of less than 0.5 inch and more preferably of less than 0.25 inch.

Second portion 9 extends from first portion 8, and projects to a predetermined distance from the adjacent flange member when the packing material is deformed to a extent predetermined to form a leak-free seal. Second portion 9 may be of the same or of different materials from which first portion 8 is made. Second portion 9, which projects from first portion 8 toward adjacent flange member 1 outwardly of the spring means, may be straight, or curved to accommodate the other elements of the flange assembly. The angle between the plane of first portion 8 and the axis 19 along the length of second portion 9 will generally be between about 5° and about 175°, preferably between about 45° and about 135°, more preferably between about 60° and 120°. In the most preferably embodiment, second portion 9 is parallel to the axis of the indicator fastener, and forms an angle of approximately 90° with first portion 8.

Figure 4:
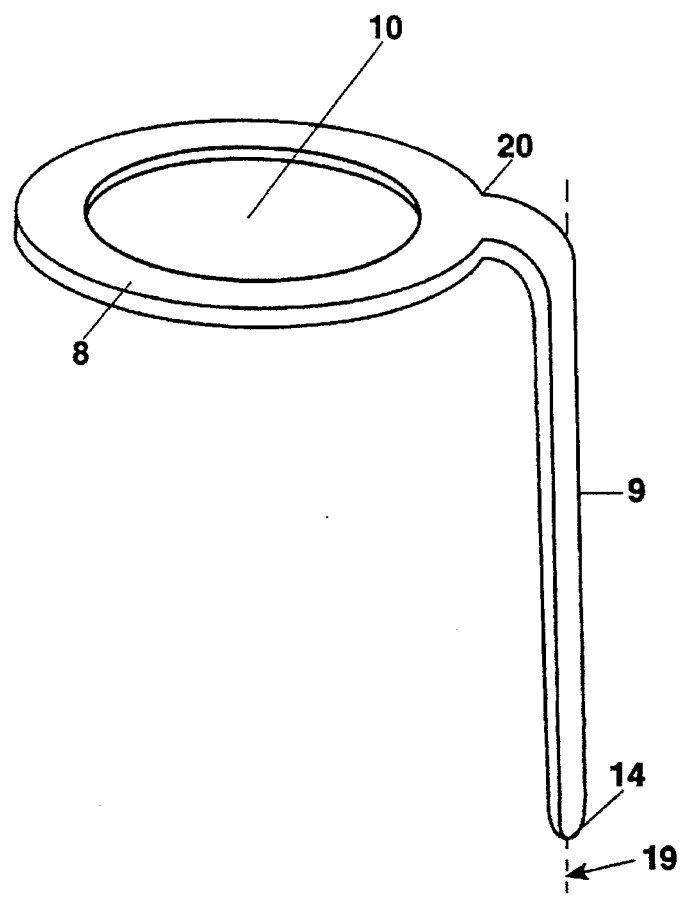
Figure 5:
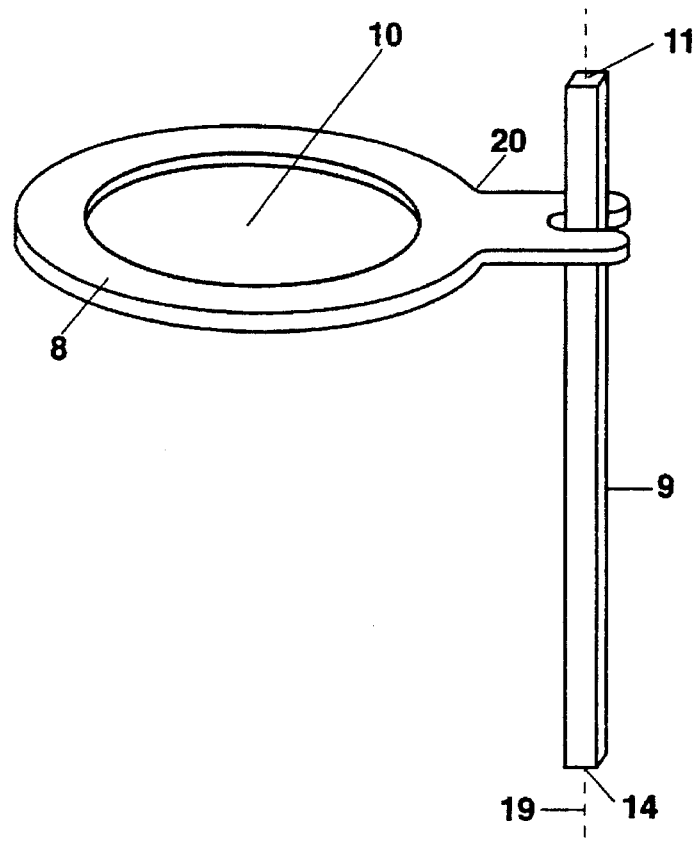

Second portion 9 may be continuous with first portion 8, as shown in FIG. 4, extending from the rim of first portion e outward of the spring means to a predetermined distance 18 from the adjacent flange element. Alternatively, first portion 8 and second portion 9 may be distinct and separate adjustably attached elements or groups of elements, as in FIGS. 3 and 5. When first portion 8 and second portion 9 are separable, the indicator comprises means for adjustably mounting second portion 9 to first portion 8, wherein the mounting means are such that a fixed, unmovable joint between the first portion and outer portion is established. Means suitable for attaching a flat metal component to a component elongated in at least one dimension is suitable for mounting second portion 9 to first portion 8 of this invention. Examples include mounting second portion 9 with stops, set screws, collars, and nuts, or by inserting either of first portion 8 or second portion 9 into a slot or aperture of the other (an example is illustrated in FIG. 5) are within the scope of this invention. While second portion 9 may be bonded to first portion 8 using bonding agents such as glue or welds, these methods are less preferred. Second portion 9 may be secured to first portion 8 along the rim of first portion 8. Alternatively, first portion 8 may include second aperture 11 for receiving and securing second portion 9 to first portion 8. In the specific embodiment shown in FIG. 3, distal end 14 of second portion 9 is secured to first portion 8 using stops 12a and 12b such as a nut or a set screw collar, with a first stop 12a bearing against a side of the first portion and a second stop 12b bearing against a side of the first portion opposite that of the first stop to adjustably mount the second portion onto the first portion. One or more indicator spring means 13 may be included between stop 12a and first portion 8, wherein stop 12b bears against a side of the first portion of the deformation indicator and spring means 13 bears against a side of the first portion opposite that of stop 12b to adjustably mount second portion 9 onto first portion 8. Indicator spring means 13 useful for the present invention are well known in the art, and include, as examples, conical compression springs, coil springs, lock washers, split washers or combinations thereof.

When the fasteners on the flange assembly are adjusted to deform the packing material such that the flange assembly is leak-free for its intended use, distal end 14 of second portion 9 is positioned a predetermined 18 distance from adjacent flange member 1. Distal end 14 is preferably positioned such that the distance between distal end 14 and adjacent flange member 1 can be easily determined and reproduced, using, for example, a micrometer or a "feeler gauge" to determine the distance, when the fasteners on the flange assembly are readjusted. The accuracy with which the deformation of packing material within the flange assembly can be reproduced when the fasteners on the flange assembly are readjusted according to this invention is not easily achieved by devices presently available. In the present invention, the amount of deformation can be easily measured without having to dismantle any portion of the flange assembly, or endangering the operator by requiring making measurements internal to the flange assembly itself, the measurement of the distance between distal end 14 and adjacent flange member 1 being external to the flange assembly.

Therefore, in the practice of the use of the deformation indicator of this invention, a flange assembly comprising first and second flange members, a packing material positioned between the flange members, a plurality of fasteners connecting the flange members and spring means mounted on the fasteners is prepared by adjusting the fasteners such that the packing material is deformed to a predetermined extent to form a leak-free seal. At least one deformation indicator mounted on an indicator fastener is then adjusted and the distance between an adjacent flange member and the distal end of a second portion of the deformation indicator determined. Following a period of use, the flange assembly is inspected, and the distance between the distal end of the deformation indicator and the adjacent flange member is again determined. If the distance following use varies from the previously determined distance by an amount greater than the maximum permitted for that particular application, the fasteners on the flange assembly are readjusted, generally be tightening, to urge the flange members in compressive force against the packing material and to restore the distance between the distal end of the second portion and the adjacent flange member to the previously determined distance. Restoring the distance between the distal end of the deformation indicator and the adjacent flange member generally restores the seal between the packing material and the flange members without crushing or otherwise damaging the packing material.

What is claimed is:

1. A flange assembly comprising diametrically opposed flange members, a packing material interposed between the flange members, a plurality of fasteners connecting the flange members, spring means mounted on the fasteners for applying compressive force to the flange members to form leak-free seals between the flange members and the packing material, and at least one seal deformation indicator mounted on an indicator fastener connecting the flange members and having a first portion that extends outwardly from the longitudinal axis of the indicator fastener and a second portion extending at an angle from the first portion in the direction of an adjacent flange member, the second portion having a distal end positioned at a predetermined distance from the adjacent flange member when the packing material is deformed to a predetermined extent to form a leak-free seal.

2. The flange assembly of claim 1 wherein the indicator fastener is a bolt having a distal end distal from the flange members, a threaded portion adjacent the distal end and at least one nut mounted on the threaded portion, which nut bears against the deformation indicator mounted on the bolt.

3. The flange assembly of claim 2 wherein the bolt has at least one spring means mounted thereon, and wherein the deformation indicator is mounted axially inward of the distal end of the bolt and axially outward of the spring means mounted on the bolt.

4. The flange assembly of claim 3 wherein the deformation indicator is mounted between two nuts, each of which bears against one side of the deformation indicator, or between a nut and the head of the bolt, each of which bears against one side of the deformation indicator.

5. The flange assembly of claim 1 wherein the first portion of the deformation indicator is mounted on the indicator fastener, and the second portion of the deformation indicator projects from the first portion toward the adjacent flange member, radially outwardly of the spring means.

6. The flange assembly of claim 5 wherein the first portion of the deformation indicator lies in a plane perpendicular to the longitudinal axis of the indicator fastener and the second portion of the deformation indicator projects from the first portion at an angle between about 60° and about 120°.

7. The flange assembly of claim 1 wherein the first portion of the deformation indicator comprises a first aperture, the indicator fastener being received therethrough.

8. The flange assembly of claim 7 wherein the first portion of the deformation indicator comprises a second aperture, the second portion of the deformation indicator being received therethrough, and, wherein the deformation indicator comprises means for adjustably mounting the second portion to the first portion.

9. The flange assembly of claim 8 wherein the second portion of the deformation indicator comprises at least two stops mounted thereon, with a first stop bearing against a side of the first portion and a second stop bearing against a side of the first portion opposite that of the first stop to adjustably mount the second portion onto the first portion.

10. The flange assembly of claim 8 wherein the second portion of the deformation indicator comprises at least two stops and at least one indicator spring means positioned between the stops, wherein a first stop bears against a side of the first portion of the deformation indicator and a spring means bears against a side of the first portion opposite that of the first stop to adjustably mount the second portion onto the first portion.

11. The flange assembly of claim 10 wherein the indicator spring means is selected from the group consisting of a conical compression spring, a coil spring, a lock washer, a split washer and combinations of elements from the group.

12. The flange assembly of claim 11 wherein the indicator spring means is a conical compression spring.

13. The flange assembly of claim 1 wherein the spring means is selected from the group consisting of a conical compression spring, a coil spring, a lock washer, a split washer and combinations of elements from the group.

14. The flange assembly of claim 13 wherein the spring means is a conical compression spring.

15. The flange assembly of claim 8 wherein the second portion of the deformation indicator projects from the first portion at an angle of 90°.

16. A method of maintaining a flange assembly in a leak-free condition, the flange assembly comprising first and second flange members, packing material positioned between the flange members, a plurality of fasteners for connecting the flange members, and at least one deformation indicator comprising a first portion mounted on a fastener and a second portion extending from the first portion such that a distal end of the second portion is a predetermined distance from an adjacent flange member, the method comprising adjusting the fasteners such that the packing material is deformed to a predetermined extent to form a leak-free seal, determining the distance between the adjacent flange member and the distal end of the second portion and readjusting the fasteners to urge the flange members in compressive force against the packing material and to restore the distance between the distal end of the second portion and the adjacent flange member to the previously determined distance.

* * * * *